United States Patent [19]

Björklund

[11] Patent Number: 4,683,870

[45] Date of Patent: Aug. 4, 1987

[54] APPARATUS FOR DEICING EXTERIOR PARTS OF A RAILWAY VEHICLE

[75] Inventor: Björn Björklund, Västerhaninge, Sweden

[73] Assignee: AB Svenska Flaktfabriken, Nacka, Sweden

[21] Appl. No.: 757,491

[22] Filed: Jul. 22, 1985

Related U.S. Application Data

[63] Continuation of Ser. No. 349,812, Feb. 18, 1982, abandoned.

[30] Foreign Application Priority Data

Mar. 16, 1981 [SE] Sweden .................................. 8101659

[51] Int. Cl.⁴ ........................... F23C 5/00; B61B 12/00
[52] U.S. Cl. ..................................... 126/271.1; 134/30; 104/307
[58] Field of Search ..................... 134/5, 30, 37, 45, 50, 134/55, 105; 37/199, 200, 227; 98/4, 7, 12 R; 104/1 R, 279, 280; 246/428, 444; 165/42, 43; 126/271.1

[56] References Cited

U.S. PATENT DOCUMENTS

| 1,893,329 | 1/1933 | Hynes | 104/1 R |
| 2,598,293 | 5/1952 | Parker et al. | 104/1 R |
| 3,513,779 | 5/1970 | Aitken | 104/1 R |
| 3,800,858 | 4/1974 | Placek | 104/1 R |
| 4,191,242 | 3/1980 | Kumagai | 165/43 |
| 4,219,071 | 8/1980 | Careglio et al. | 165/42 |
| 4,356,965 | 11/1982 | Matsushima et al. | 165/42 |

FOREIGN PATENT DOCUMENTS

| 806229 | 7/1951 | Fed. Rep. of Germany . |
| 1604774 | 11/1972 | Fed. Rep. of Germany . |
| 2156956 | 3/1973 | Fed. Rep. of Germany . |
| 2752187 | 6/1979 | Fed. Rep. of Germany . |
| 403961 | 9/1978 | Sweden . |
| 345597 | 3/1960 | Switzerland . |
| 474384 | 8/1969 | Switzerland . |
| 477308 | 10/1969 | Switzerland . |
| 573712 | 3/1976 | Switzerland . |
| 987946 | 3/1965 | United Kingdom . |

Primary Examiner—S. Leon Bashore
Assistant Examiner—Michael K. Boyer
Attorney, Agent, or Firm—Antonelli, Terry & Wands

[57] ABSTRACT

The present invention discloses an apparatus for deicing the exterior of a railway vehicle that uses heated air which is blown at a railway vehicle at 5-35 m/sec and subsequently recycled for reblowing.

4 Claims, 6 Drawing Figures

APPARATUS FOR DEICING EXTERIOR PARTS OF A RAILWAY VEHICLE

This is a continuation of Application Ser. No. 349,812 filed Feb. 18, 1982, now abandoned.

BACKGROUND OF THE INVENTION

The present invention relates to a method and an apparatus for deicing objects, and to a method for transmitting overpressure through a passage which is blocked for dynamic pressure.

Rapid tempering has a number of applications. Thus, it is desirable to be able to quickly deice and dry vehicles, such as railway wagons, cars and deck containers. In winter it is also desirable to be able to quickly deice material, such as iron girders, which are stored outdoors, before they are used for instance in a welding shop, like a shipyard or the like. Another field of application is thawing of frozen products.

The object of the present invention is to provide a method and provide an apparatus for deicing objects, which method and apparatus are energy saving and, especially at deicing, do not result in large contents of moisture of the ambient air with associated problems of condensation on cold surfaces.

This object is obtained by a method of deicing objects which is characterized in that air or another gaseous medium having a low overtemperature is blown with high speed onto the object to be tempered, and by an apparatus for deicing objects which is characterized in that means are provided to heat air or another gaseous deicing medium, and in that exhaust means are provided to exhaust said heated medium with high speed in jets directed towards objects to be tempered.

Another object of the invention is to suggest a method of developing a counterpressure to prevent undesired flow of air or diffusion of gas to a room in which a dynamic counterpressure cannot be produced. In this way also the abovementioned problem of condensation can be further reduced by producing such a counterpressure by dry air around those surfaces which are exposed to condensation.

This object is obtained by a method of transmitting an overpressure through a passage which is blocked for dynamic pressure, which method is characterized in that a static pressure is produced across the orifice of said passage.

Deicing of railway wagons has so far been effected only by heat transfer to the underframe or bogie wagon or the train and this has been done by air of high temperature and moderate speed. By means of air heaters equipped with fans, air having a temperature exceeding 50° C., typically 70° C., has been oriented towards parts of the bogies and other places where the quantity of ice usually is most important with a typical striking velocity of 0.5 m/sec.

An obvious disadvantage of this previously known solution is that the high temperature which is used results in evaporation of large quantities of water by the hot air which gives the air high contents of moisture. Evaporation of water consumes large quantities of heat and installed heating effect must be dimensioned for ice melting as well as evaporation of a large quantity of water. The energy consumption therefore becomes unnecessarily large. The moisture absorbed by the air also results in a need for fast circulation of air in the room in which the deicing is performed for the drying of the air.

In the method and apparatus according to the invention the transfer of heat from the air to the bogie wagon of the train is performed by convection.

The rate of transfer which is a function of the coefficient of heat transfer for transmission of heat by convection, $\alpha$, and the temperature difference between the bogie wagon or wagon chassis and intake air, $\Delta t$, is given by $$Q = \alpha \cdot \Delta t$$

where Q denotes the transferred quantity of heat.

A lower temperature of the intake air thus can be compensated for by a higher value of $\alpha$.

The coefficient of heat transfer $\alpha$ is a function of the radiation temperature, the ambient temperature and the speed of the air towards the surface in question.

The radiation part of the heat transfer is equal to $0.96 \cdot$ emission number $\cdot \Delta t_s$, where 0.96 = Stefan Boltzmann's number,
emission number for water, ice, frost = 0.95 − 0.98, for painted surface = 0.90 − 0.97,
$\Delta t_s$ = counterradiation temperature.

The radiation exchange in deicing of bogie wagons or wagon chassis takes place between the floor of the hall and the bogie wagon or wagon chassis and is influenced only in a marginal manner by flows of air and rates of flows.

The influence on the heat transfer by ambient temperature is according to G Brown for a cold surface:

$$2.08 \cdot \Delta t^{0.31} \cdot L^{-0.08} k$$

where
$\Delta t$ = the temperature difference between air and surface in °C., and
L = characteristic length in meters.

The above temperature difference $\Delta t$ can to a great extent be influenced in the present invention since the temperature of the intake air can be chosen.

The relation above between the heat transfer and the temperature difference $\Delta t$ is graphically represented in FIG. 1.

The air speed towards the bogie wagon or wagon chassie has an influence on the heat transfer for air speeds exceeding 5 m/sec. This influence can be roughly estimated from the formula $$\alpha_v = 7.6 \cdot v^{0.78}$$

where v = air speed in m/sec and is graphically illustrated in FIG. 2.

Like the temperature difference $\Delta t$ also the air speed v can be influenced in the apparatus according to the invention in which controlled blowing is used.

From the above relationship and the graphical illustration in FIGS. 1 and 2 it appears that a change in the speed of the air of 0.5 m/sec gives roughly the same change of the $\alpha$-value as a change of the temperature of 40° C. The heat transfer is a function of the $\alpha$-value and the temperature difference, as seen above, and therefore an increase of the speed is compensated for by a temperature difference which is smaller than the one which the change in the $\alpha$-value alone indicates. A reduction of the temperature difference with 20° C. can, in principle, be compensated for by an increase of speed of about 1 m/sec.

Thus, in the present invention the heat transfer from the intake air to ice/wagon is performed as quickly as or quicker than in the abovementioned prior art with a considerably lower air temperature since the higher speed results in a larger heat transfer number.

A fundamental condition for the use of a high air speed is that this speed shall be present on all the surfaces to be treated. In the apparatus according to the invention this is realized by jet streams of air or another gaseous tempering medium directed towards the object to be treated.

The advantages of using an increased air speed instead of high overtemperature are among others that the zone nearest to the wagons does not get a disagreeably high temperature. As indicated above a high temperature also results in evaporation of large quantities of water which requires considerable energy and consequently gives a high energy consumption. Through the evaporation the air gets large contents of moisture which in its turn gives rise to condensation on cold surfaces. If the air is supposed to hold a relative humidity of 30% the water contents are changed from 30 g/kg to 10 g/kg when the air temperature is decreased from about 55° C. to about 35° C. Translated to a cold surface subjected to condensation deposit this means that a surface temperature of about 15° C. has deposit of damp for the cooler air whereas deposit of damp occurs up to a temperature of about 32° C. for the warmer air.

According to an advantageous further developement of the invention circulating air is used for the deicing whereby large evaporation is avoided even if the moisture contents of the air are high.

According to another advantageous embodiment of the invention a large fraction of exterior air is used in a drying step following the thawing step whereas only a smaller part or the air is circulated. The exterior air is then preheated.

To prevent condensation in the driving motors of the trains during deicing dry air is forced to pass through the cooling air inlets of the motors. In the prior art this has been done by means of hoods which are connected to flexible tubes and placed over the cooling air inlets, with the dried air of indoor temperature being supplied through said flexible tubes during the deicing.

According to the present invention humid deicing or defrosting air is prevented from penetrating "through the backway" into the air outlets of the motors and condensing on windings and other surfaces of the motors by producing a static overpressure around the air inlets on the sides of the wagon since dynamic pressure cannot be transmitted because of the so-called labyrinth grating structure of the air inlets. The static overpressure is produced by blowing air at high rates towards the cooling air inlets of the motors, with a static overpressure being produced around the air inlet. The moisture content of the air must be lower than the dew point of the motors, and is therefore preferably formed by dry, preheated exterior air. By the thus developed static pressure the dry air is pressed through the motors and prevents humid air from penetrating through the cooling air outlets and condensing on cold surfaces in the motor.

DETAILED DESCRIPTION

Figure 1:
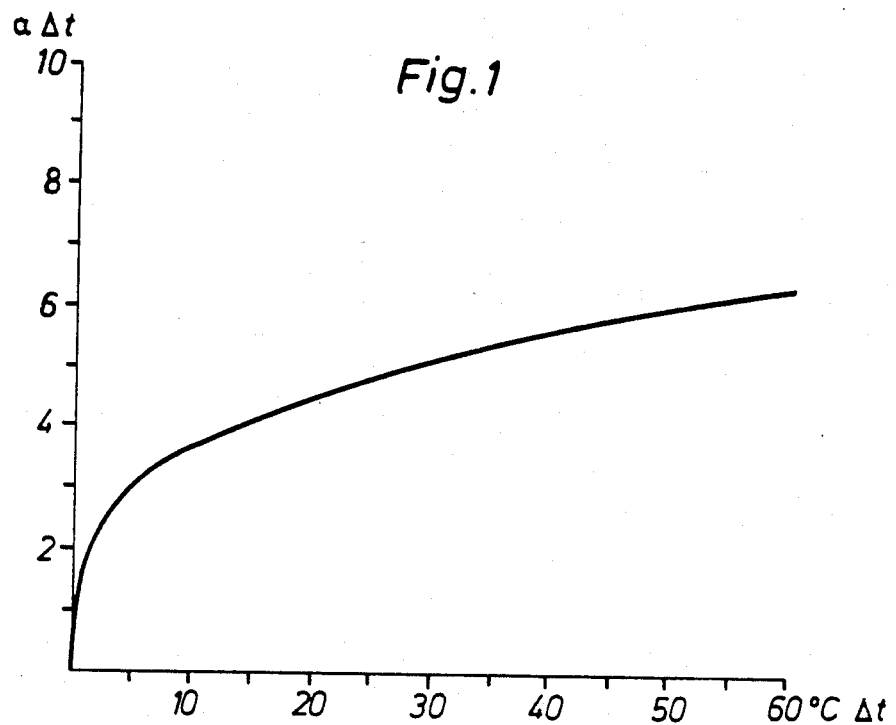
FIGS. 1 and 2 respectively graphically illustrate a variation in a coefficient of heat transfer with a temperature difference and a rate of flow.
Figure 2:
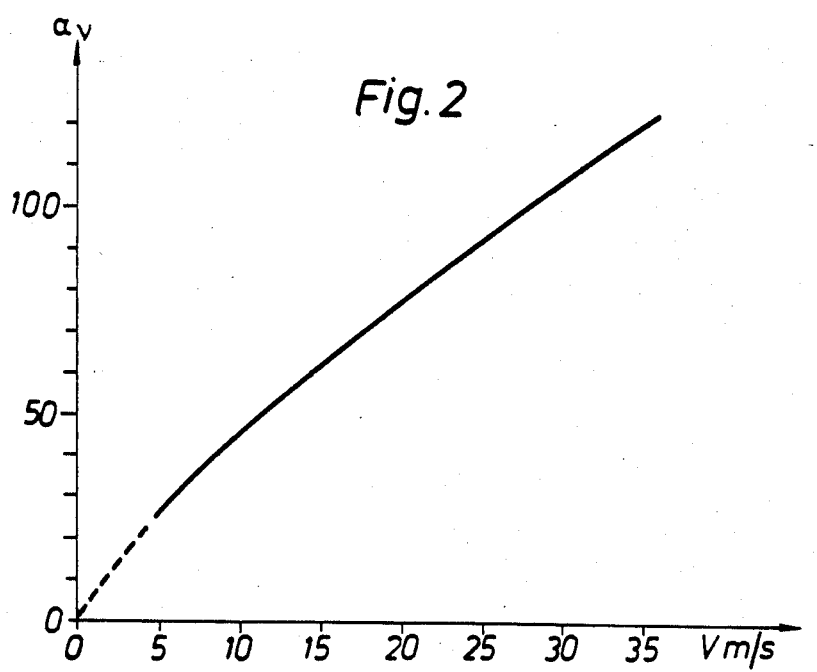
Figure 3:
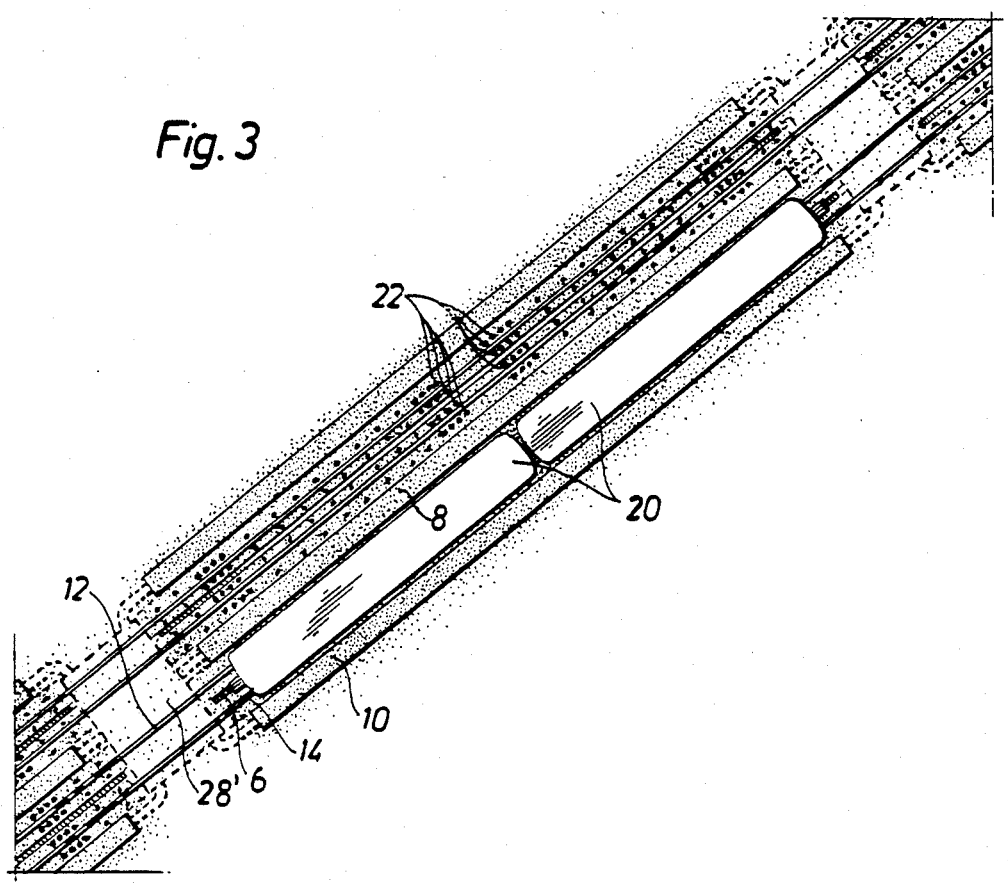
FIG. 3 is a top view of a deicing plant for railroad trucks or wagons constructed in accordance with the present invention.
Figure 4:
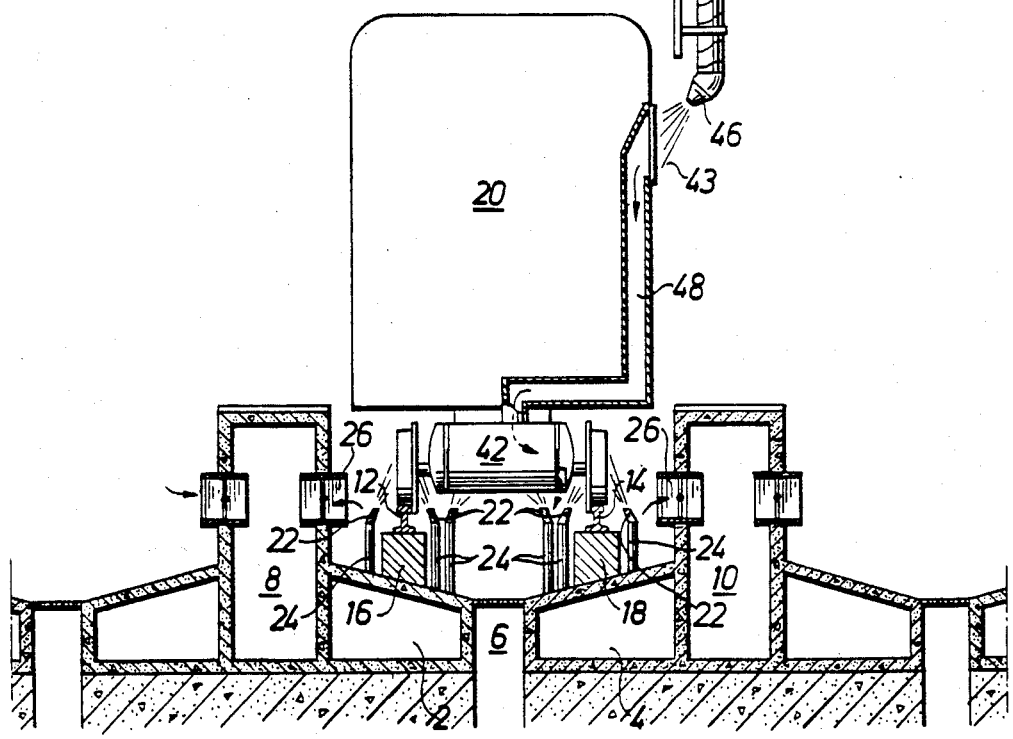
FIG. 4 is a transverse cross-sectional view of a portion of the deicing plant in FIG. 3.

The embodiment shown in FIGS. 3 and 4 of the apparatus according to the invention for deicing railway trucks or wagons comprises two hot air passages 2, 4 separated by a draining room 6. Outside the hot air passages 2 and 4 return passages 8 and 10 extend parallel to the hot air passages. On the hot air passages 2, 4 rails 12, 14 are supported by supports 16, 18 for carrying trucks or wagons 20 to be deiced.

The air in the passages 2 and 4 is exhausted through nozzles 22 which are supported by steel pipes 24 connected to the passages 2, 4. The nozzles are disposed more closely to each other in the bogie and motor regions of the trucks or wagons, of FIG. 3, and directed to give as effective thawing as possible.

The major part of the air exhausted for thawing through the nozzles 22 is sucked back into the return passages 8, 10 through apertures 26 provided with valves so that a substantially circulating flow of air is used for the thawing. This is important as the thawing air has comparatively large contents of moisture which otherwise should require a much more effective ventilation of the hall in which the treatment takes place. As shown in FIG. 3, the passages 2, 4, 8, 10 are connected by fan sets 28' situated in hollows, with the fan sets supplying two sections of the passages.

In practice, a deicing plant having the apparatus according to the invention is formed with two or possibly more tracks for deicing railway trucks or wagons, with the tracks extending parallel to each other, as shown most clearly in FIGS. 3 and 4. The return passage 8 extending between said tracks then serves as return conduit for thawing air from both treatment tracks.

With the adjustment valves 26 the recirculating part of the air can be controlled. During thawing a fraction is drawn off corresponding to the quantity of air which is drawn off for ventilation of the hall, whereas the rest, typically 80 through 90%, is recirculated. After the thawing motors and bogie, are dried, a large fraction of dry exterior air then being used.

The fan sets 28 are in addition to fans for increasing the pressure means for preheating exterior air to be used. For this preheating a fluid coupled heat recovery system of the type disclosed in, for example, U.S. Pat. No. 4,061,186, so-called ECOTERM-system, can preferably be used. The total amount of recirculating air is heated with separate heating means.

A railway truck or wagon can typically contain 1000 kg of ice and snow when brought into the hall for deicing and drying. With a plant according to the invention deicing and drying can be performed in about three to four hours. 5 m³/sec of blowing air having a temperature of about 30° C. is then used. During the thawing about 0.5 m³/sec is drawn off, corresponding to necessary ventilation of the hall, whereas the rest is returned. The temperature of the recirculating air is during the deicing period typically 15° C. below that of the blown hot air. The striking velocity of the blown air towards parts of the bogie wagons or chassis to be deiced is normally in the range 5 to 35 m/sec depending on the distance between nozzle and vehicle part as well as the design of the nozzle. It is then of basic importance that there is a high velocity on all surfaces to be deiced. Also velocities still higher than those mentioned can be used if necessary.

Figure 5:
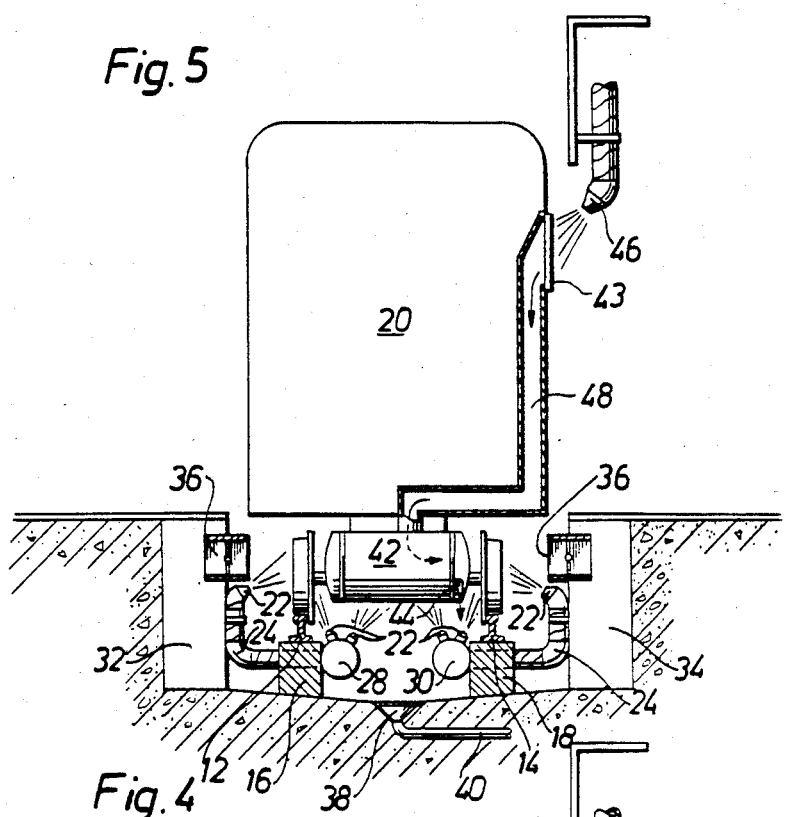
FIG. 5 is a transverse cross-sectional view of another embodiment of the deicing plant constructed in accordance with the present invention provided with means for producing a static overpressure at cooling air inlet of motors.

In FIG. 5 an alternative embodiment is shown of the apparatus according to the invention. In this embodiment hot air is supplied through circular sheet metal drums 28, 30 which extend along the supports 16, 18 which are supporting the rails 12, 14. On the drums 28, 30 nozzles 22 are disposed to blow the air in the form of jets towards the surfaces to be deiced. The outer nozzles 22 are preferably provided only near boggies and converters of the wagon or truck 20. In the same way as in the embodiment shown in FIGS. 3 and 4 return passages 32, 34 are disposed outside the rails 12, 14 for recirculation of the thawing air, said passages having apertures 36 provided with valves.

Between the rails 12, 14 a draining 38, 40 is provided in the floor in the same way as in the previously described embodiment for draining off melted ice and snow.

In both the described embodiments the nozzles are mounted on conduits of a material having a high corrosion resistance, such as stainless steel, while the nozzles themselves are formed in a flexible material, such as rubber, in order not to be damaged by falling blocks of ice.

To prevent humid thawing air from penetrating "the backway" into the air outlets 44 of the motors 42 and condensing on windings and other surfaces in the motors, dry air is, according to the invention, forced to pass through the cooling air apertures of the motors 42. The cooling air inlets 43 of the motors 42 are covered with a so-called labyrinth grating through which a dynamic pressure cannot be transmitted. According to the invention a static overpressure is instead produced around the air inlet 43 by means of air jets exhausted through nozzles 46. The air which then is exhausted through the nozzles 46 shall have contents of moisture which are lower that the dew point of the motors 42, and said air can preferably consist of dry, heated exterior air. By the static overpressure produced at the air inlet the dry air will be forced through the outlet grating on the side of the wagon or truck and down through the passage 48 and through the motors, see FIGS. 4 and 5, so that humid air cannot penetrate into the motors and condense on cold surfaces therein.

Figure 6:
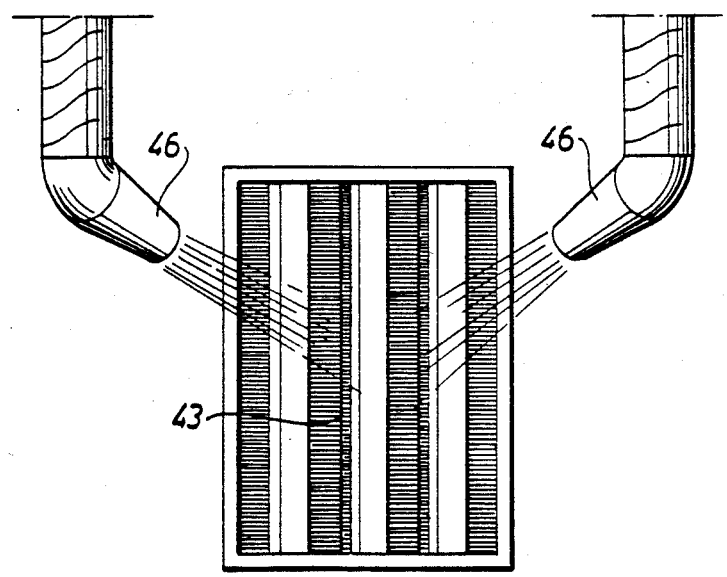
FIG. 6 is a detail view of a cooling air inlet provided with a means for producing a static overpressure.

Two nozzles 46 are preferably provided to blow air obliquely from the top downwards towards the inlet 43, as illustrated in FIG. 6. The rate of blowing of the air is preferably substantially the same as the speed of the air from the nozzles 22 and the striking velocity is normally in the range 5 to 40 m/sec. Through the generally favorable positioning of the nozzles the striking velocity is in general in the upper part of the interval. Also striking velocities above this interval can be used if required.

I claim:

1. An apparatus for deicing vehicle exterior parts of a railway vehicle covered with snow and ice, the apparatus comprising at least one fan set including heating means for heating air to a predetermined deicing temperature and pressure increasing fan means, said at least one fan set being connected to at least one supply passage means extending in a longitudinal direction of the railway vehicle being deiced for supplying heated air, a plurality of nozzle means connected in parallel to said at least one supply passage means for blowing said heated air in the form of jets onto the exterior parts of the railway vehicle being deiced at an average striking speed of between 5–35 m/sec, and means for returning a part of the exhausted air to said fan set for reheating and reblowing.

2. The apparatus as claimed in claim 1 wherein at least one return passage means is arranged in parallel to said supply passage means, said return passage means having a plurality of means for defining apertures provided with valve means for sucking back and returning exhausted air to said heating means, the fraction of the recirculated air being controlled by said valve means.

3. The apparatus as claimed in claim 1, wherein the air is at a temperature not greater than 15° above an ambient temperature of the vehicle.

4. The apparatus according to claim 1, wherein a portion of between 80–90% of the air is returned so as to obtain a substantially closed circulation of the deicing air or gaseous medium.

* * * * *